United States Patent
Kim

(10) Patent No.: US 6,343,736 B1
(45) Date of Patent: Feb. 5, 2002

(54) REUSABLE MAILING ENVELOPE WITH TEAR-STRIP OPENING DEVICE

(76) Inventor: Myun Ho Kim, 120 E. 4th St. Apt. 3H, New York, NY (US) 10003-9099

(*) Notice: Subject to any disclaimer, the term of this patent is extended or adjusted under 35 U.S.C. 154(b) by 0 days.

(21) Appl. No.: 09/590,802

(22) Filed: Jun. 9, 2000

(51) Int. Cl.7 .................................... B65D 27/06

(52) U.S. Cl. ............... 229/303; 229/302; 229/306; 229/315

(58) Field of Search .................. 229/302, 306, 229/315, 303

(56) References Cited

U.S. PATENT DOCUMENTS

| | | | | |
|---|---|---|---|---|
| 211,725 | A | * 1/1879 | Foster | 229/315 X |
| 2,941,711 | A | * 6/1960 | Biek | 229/303 |
| 3,173,603 | A | * 3/1965 | Neuman | 229/315 |
| 4,602,736 | A | * 7/1986 | Barr | 229/306 X |
| 4,669,652 | A | * 6/1987 | Seguin | 229/306 X |
| 4,688,715 | A | * 8/1987 | Barr | 229/306 X |
| 5,092,515 | A | * 3/1992 | Murray | 229/302 |
| 5,251,810 | A | * 10/1993 | Kim | 229/303 |
| 5,400,957 | A | * 3/1995 | Stude | 229/302 X |
| 5,516,040 | A | * 5/1996 | Lin | 229/302 |
| 5,713,511 | A | * 2/1998 | Diamond | 229/302 |
| 6,129,269 | A | * 10/2000 | Tait | 229/303 X |

FOREIGN PATENT DOCUMENTS

| | | | | |
|---|---|---|---|---|
| FR | 2612887 | * | 9/1988 | 229/306 |
| IT | 0256324 | * | 12/1927 | 229/315 |

* cited by examiner

Primary Examiner—Jes F. Pascua
(74) Attorney, Agent, or Firm—Abelman, Frayne & Schwab

(57) ABSTRACT

A reusable envelope has a front address panel and a rear panel joined along three edges to form a pocket with an open top. A first extended sealing flap joined to the top edge of the address panel is provided with a tear strip formed by a line of perforations extending across the top edge of the envelope and through the flap. A second sealing flap is provided which is foldably connected to the top edge of the rear panel and is initially either folded and retained inside the envelope pocket or against the exterior of the rear panel for the first mailing, and is folded over and onto the first panel for the second use. The second flap has an adhesive area securing means for sealing the envelope when the flap is positioned on the address panel for a further mailing. The address panel is provided with an area is for postage indicia and, is optionally provided with a first return address area adjacent the top edge of the address panel. The address panel optionally includes a second return address area located adjacent the bottom edge of the address panel and another area for applying postage. The second sealing flap is sized to cover at least the first return address area and first postage area and, optionally, the first address area, when the second sealing flap is folded over and sealed to the address panel, and can also be pre-printed by the originator with return address and bulk mailing indicia. A single-use easy-open envelope employing the tear strip is also described.

11 Claims, 8 Drawing Sheets

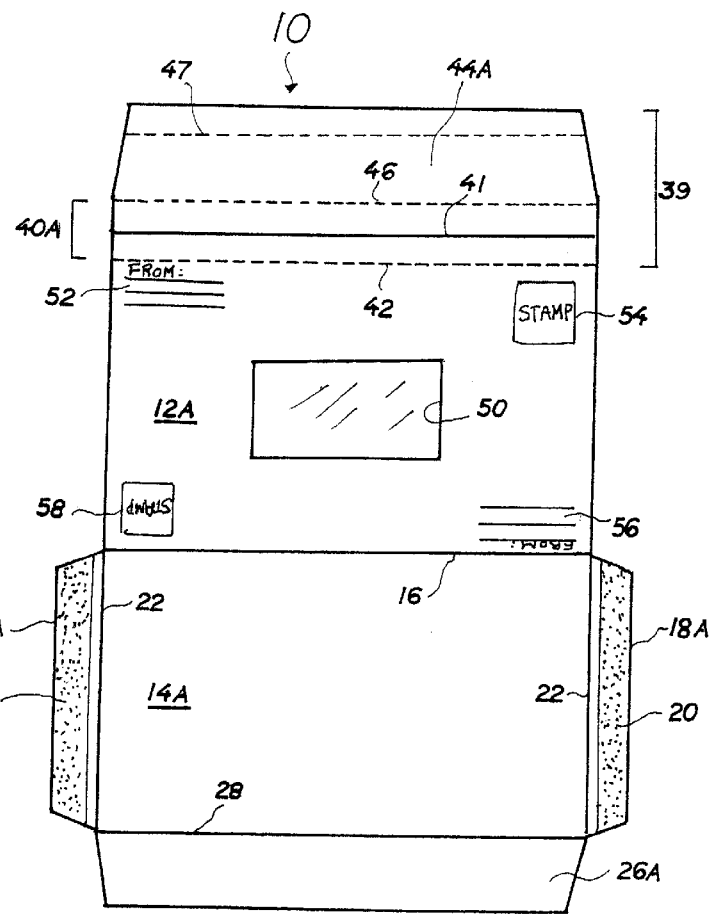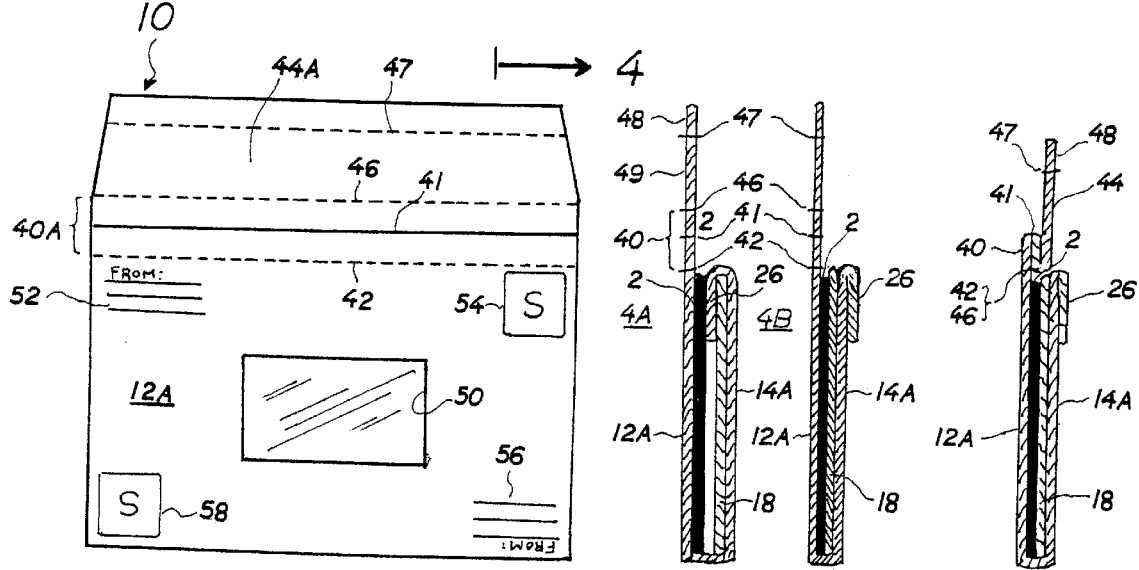

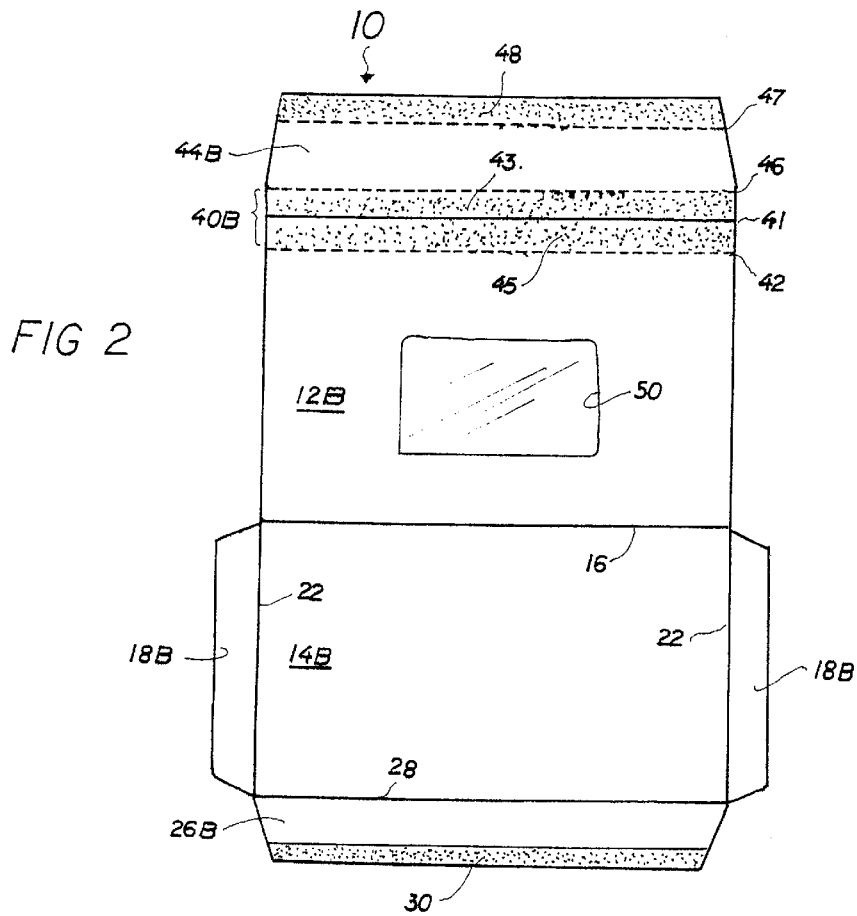
FIG 2
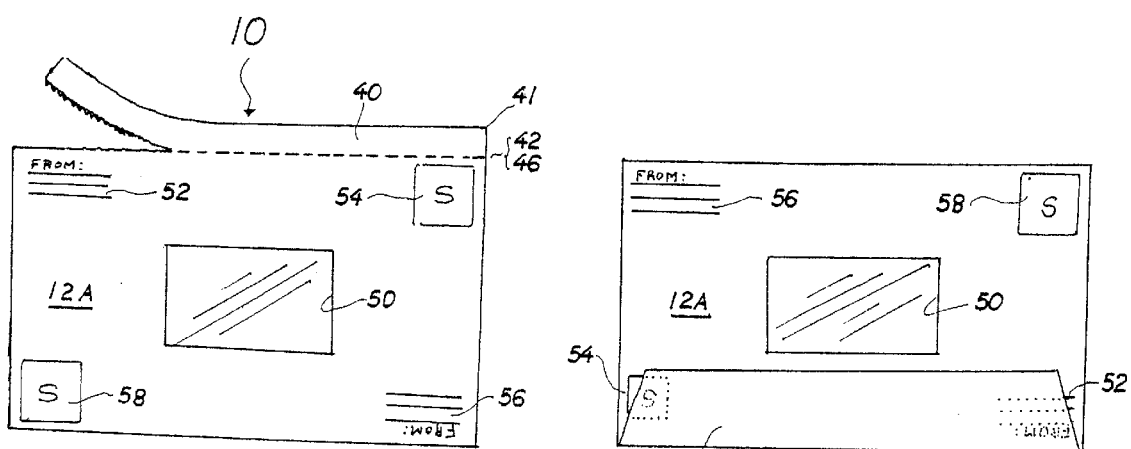
FIG 6
FIG 7

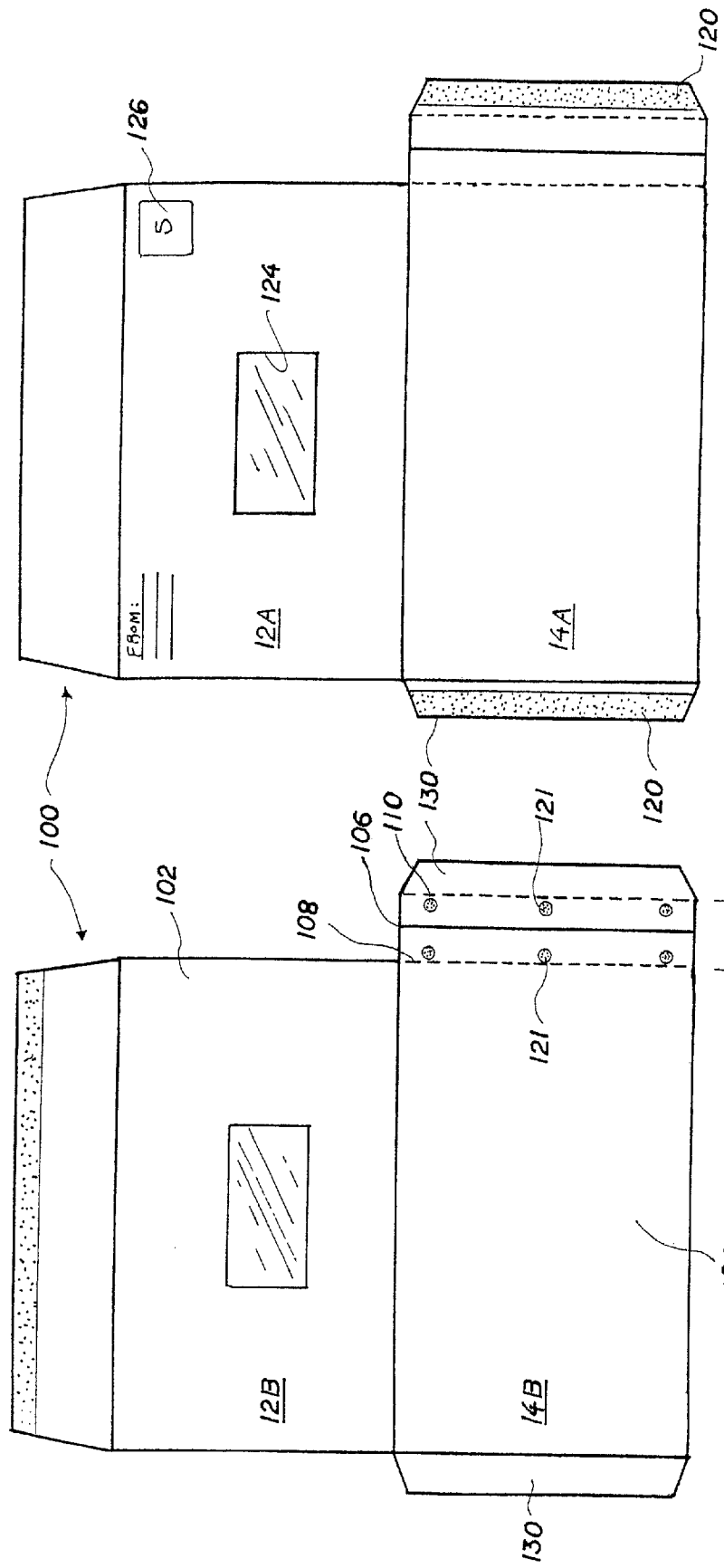

REUSABLE MAILING ENVELOPE WITH TEAR-STRIP OPENING DEVICE

BACKGROUND OF THE INVENTION

The present invention relates to a remailable or two-way envelope adapted to be used after its first mailing to return an enclosure, such as a payment or the like, to the original sender.

Remailable envelopes are well known in the art and numerous patents describe many different variations of remailable envelopes. Some examples of patents showing this type of envelope include U.S. Pat. No. 4,730,768 to Gendron; U.S. Pat. No. 5,251,810 to Kim; and U.S. Pat. No. 5,875,964 to Pham.

It has been found that the remailable envelopes of the prior art have not received widespread commercial acceptance by manufacturers or approval by recipients who are obliged to use them.

It is therefore an object of the present invention to provide a reusable envelope that can be quickly and easily opened and provides a return envelope that is easy for the recipient to use.

It is also an object of the invention to provide a reusable envelope that is relatively simple in construction as compared to those of the prior art, that is inexpensive to manufacture on existing production machines, and that can be used both in the manufacture of direct mail articles in which the preprinted enclosures are placed in the envelope pocket during the formation of the envelope, and also to produce finished envelopes into which the enclosures are placed subsequently by the original user.

It is a further purpose of the invention to provide an easy-opening envelope that permits rapid access to the contents of the envelope pocket without the possibility of damaging the enclosures.

SUMMARY OF INVENTION

The improved envelope of the present invention includes an address or front panel and a rear panel that are joined along the periphery of three edges to form an envelope pocket with an open top for receiving enclosures. A first sealing flap is formed as part of an extended flap panel that is joined to the top edge of the front address panel along a first weakened parting line, e.g., a line of perforations. The extended flap panel is folded along a transverse flap fold line that is parallel to, and spaced apart from the top edge of the address panel and is provided with a second weakened parting line, i.e., a line of perforations that is aligned with the first line of perforations when the flap panel is folded to a superposed position over the rear panel. The upper portion of the envelope between the flap fold line and the overlying perforation lines defines a tear strip. The flap fold line is spaced from the perforations a distance that is sufficient to permit the recipient to grip the tear strip for removal to open the top of the envelope. In a preferred embodiment, the area between the flap fold line and perforation lines includes a layer of adhesive joining the opposing sides of the tear strip. The adhesive can be applied as a liquid, a hot-melt composition, or as a separate laminate of polymeric material that is activated by heat, ultrasound, or the like, such materials and methods being well known in the art. The adhesive provides additional strength to the tear strip and facilitates the removal of the tear strip cleanly. The adhesive also constitutes a barrier to the undesired movement of the envelope's enclosure(s) into the tear strip area.

In the manufacture of the envelope of the invention, the first and second lines of perforations are formed simultaneously, as by passing the partially formed web, or sheet forming the envelope blank through a perforating wheel to provide conventional or slit perforations. In the manufacture of the envelope of this embodiment, the adhesive is also applied prior to the folding of the extended flap panel in the area that lies between the first and second lines of perforations.

The free end of the extended sealing flap panel and is provided with adhesive along its edge for sealing the envelope for mailing after the flap is closed over the open top of the pocket.

The front address panel is provided with a mailing address display area which can be a window, with or without a transparent cover. The manufacture of window envelopes is well known in the art.

A second sealing flap is joined along a second fold line to the top edge of the rear panel is initially folded against the rear panel either inside the pocket or on the exterior surface of the rear panel for the first use of the envelope. After the sealed envelope is opened by the first recipient's removal of the tear strip, the second sealing flap is either withdrawn from the pocket or moved from its exterior position for folding over and onto the front address panel. The second flap is also provided with securing means, such as remoistenable adhesive, for closing the open top and sealing the envelope for the second mailing.

In a preferred embodiment, the address panel is provided with postage indicia, which can include a bulk mailing permit and, optionally, has a first return address display area adjacent the top edge of the front panel. The upper right hand corner of the address panel is reserved for application of postage stamps or other postage indicia in accordance with government postal service requirements.

In a first preferred embodiment, the second sealing flap is printed with a return address display area and has an area for receiving postage or, most preferably, is provided with preprinted return postage permit indicia for postage paid by the originating party. In this embodiment, the second flap covers the originating postage indicia and return address, and, optionally, the original address display area, the second flap and has the second mailing address preprinted on the flap.

In another preferred embodiment, the front panel includes a second return address display area located adjacent the bottom edge of the address panel for use by the second sender and a corresponding area for the second sender to apply postage. In this embodiment the second sealing flap is sized to cover the first return address and originating postage area when the second sealing flap is folded over and sealed to the front panel.

In yet another embodiment of the invention, a single-use envelope of otherwise conventional construction is provided with a tear strip along one of the four edges, formed as described above, to provide for the rapid and easy-opening of the envelope.

BRIEF DESCRIPTION OF THE DRAWINGS

In order that the invention may be clearly understood and readily carried into effect, preferred embodiments of the invention will now be described, by way of example only, with reference to the accompanying drawings wherein:

FIG. 1 is a plan view of the front of a cut blank for an envelope constructed in accordance with one preferred embodiment of the present invention;

FIG. 2 is a plan view of the rear of the cut blank shown in FIG. 1;

FIG. 3 is a plan view of the partially formed envelope prepared from the blank of FIG. 1;

FIG. 4A is a cross-sectional view taken along line 4—4 in FIG. 3 showing one preferred embodiment;

FIG. 4B is a cross-sectional view taken along line 4—4 in FIG. 3; showing another preferred embodiment;

FIG. 5 is a cross-sectional view of the embodiment of FIG. 4B at a further stage in its manufacture;

FIG. 6 is a plan view of the front of a partially-opened sealed envelope constructed from the blank of FIG. 5;

FIG. 7 is a plan view of a sealed envelope constructed from the blank of FIG. 1 ready for a second mailing;

FIG. 23 is a plan view of the interior of a cut blank in accordance with another embodiment of the invention;

FIG. 24 is a plan view of the exterior of the blank of FIG. 23;

DETAILED DESCRIPTION OF THE INVENTION

Figure 8:
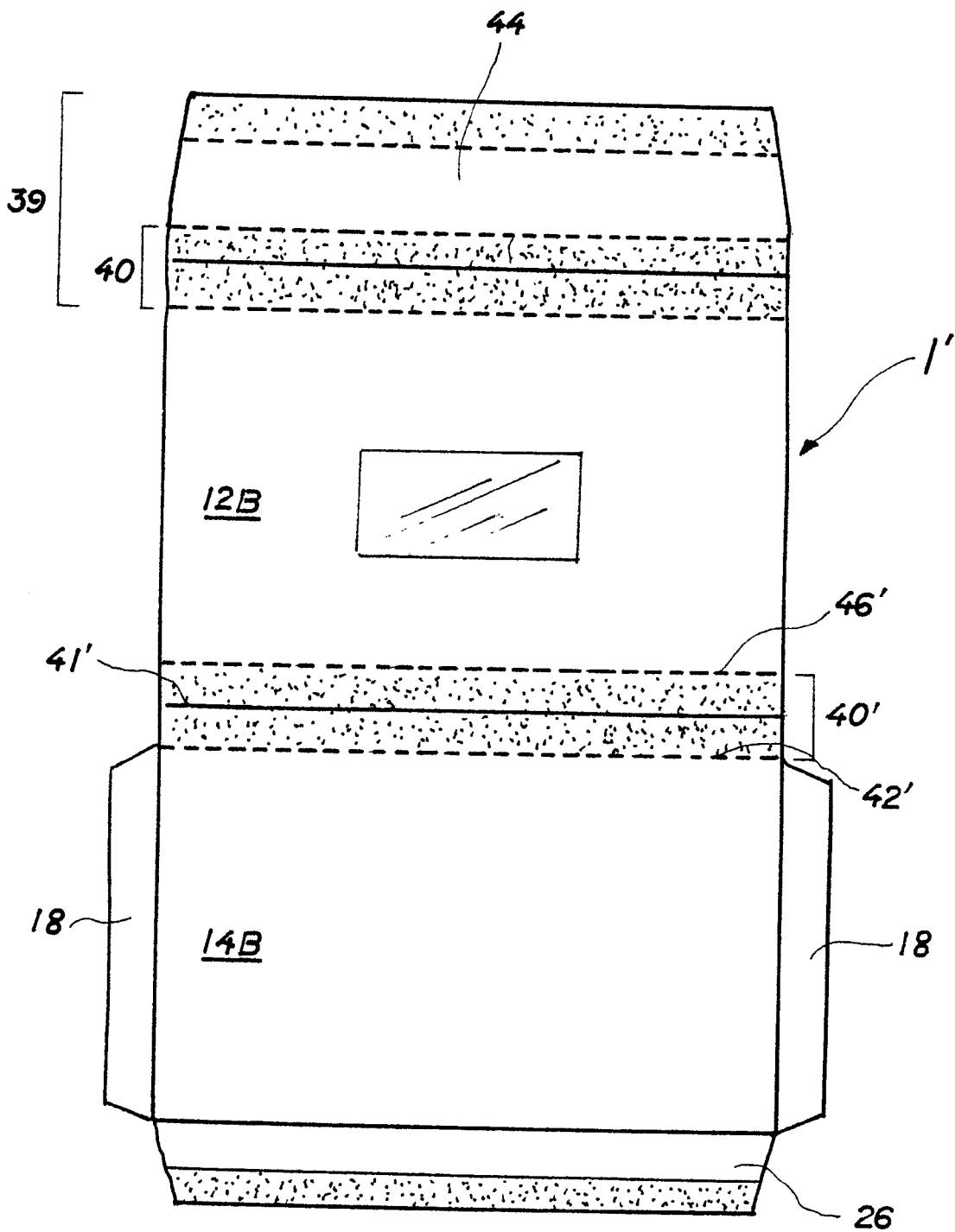
FIG. 8 is a plan view of the rear of a cut blank for an envelope constructed in accordance with another embodiment of the invention.

A pre-cut blank 1 used to construct an envelope 10 according to the present invention is shown in FIGS. 1 and 2. As used herein, the letter "A" will refer to the exterior face and the letter "B" will refer to the interior face of the cut blank 1. The cut blank 1 is typically formed from a web or larger sheet of suitable envelope grade material in accordance with methods well-known in the art. The blank includes a front or address panel 12 and a rear panel 14. Panels 12 and 14 are integrally joined along intermediate fold line 16. The panels 12 and 14 are of a similar size and generally rectangular in shape.

An extended flap panel 39 is joined to the top edge of front panel 12 along a first weakened parting line 42, which in a preferred embodiment is a line of perforations, being either slit or hole perforations. Panel 39 is also provided with transverse flap fold line 41 and a second weakened parting line of perforations 46, both of which are parallel to first perforation line 42, the area between the perforation lines 41 and 42 defining tear strip 40. The free end 44 of extended flap panel 39 is provided with adhesive 48 for sealing the envelope.

As shown in FIGS. 1 and 2, a pair of side sealing panels 18 having an adhesive area 20 on face 18A are integrally joined to the lateral edges of address panel 14 along fold lines 22. As will be apparent to one of ordinary skill in the art, side sealing panels 18 can be joined to panel 12, and can be sealed to the interior or exterior of the adjacent panel. In the mass production of direct mail articles, the envelope of the invention can be produced without side sealing panels 18 by simply applying adhesive 20 to the edges of the interior of either of panels 12 or 14.

As further shown in FIG. 1, a second return flap 26 is integrally joined to rear panel 14 along second fold line 28 and as shown in FIG. 2, includes an adhesive area 30.

In the manufacture of the envelope of the invention, adhesive 20 is applied to side flap sealing panels 18B and panels 18 are folded inwardly along lines 22. The blank 1 is folded along line 16 to place rear panel 14 on front panel 12 to form the envelope pocket. A view of the front of the envelope at this stage of manufacture is shown in FIG. 3.

A remoistenable adhesive 48 and preferably hot melt adhesive 43 is applied to extended flap 39. Extended flap 39 is folded along line 41 and passed through perforating apparatus, e.g., a perforating wheel, to simultaneously form lines of perforations 42 and 46, and, optionally, the two opposing faces of tear strip are bonded together to provide additional strength and to facilitate the clean removal of the tear strip by the recipient.

In this embodiment, address panel 12 is provided with an address display window which is either left open or closed by a transparent panel (not shown). As also shown in FIG. 1, front panel 12A is provided with a return address area 52 and a corresponding original postage area 54. In one embodiment, address panel 12A is provided with a second return address area 56 and a corresponding second stamp area 58.

As shown in cross-sectional views 4A and 4B, the second flap 26 can be folded into position inside the envelope pocket or flat against the exterior of rear panel 14A.

The cross-sectional view of FIG. 5 shows the envelope 10 ready to mail with enclosure 2 in the envelope pocket following insertion through the open top. When the enclosure 2 is inserted into envelope 10, the "TO" address is properly positioned in the display panel 50 of the window envelope. The envelope 10 is now ready for mailing.

To open the envelope 10, the tear strip 40 is removed along the perforation lines 42 and 46 as shown in FIG. 6. The tear strip 40, having been folded along fold line 41 and preferably reinforced by the bonding of adhesive areas 43 and 45, provides a convenient and easy way to remove the tear strip for opening the envelope. Upon removal of the tear strip 40, the entire top of the envelope pocket is open across the full width of the envelope and the contents of the envelope can be easily inspected and removed.

In order to re-use the envelope of this embodiment, the following steps are taken:

(a) If materials are to be returned to the sender, the recipient inserts materials into the open envelope, again with the proper "TO" address properly positioned in the display window 50.

(b) The second flap panel 26 is then moved from its position adjacent rear panel 14 and folded along line 28 over and onto address panel 12A, as shown in FIG. 7. The distance between fold line 28 and the distal or free end of return flap panel 26 is predetermined to have a length sufficient to cover the postage area at 54 and the return address area 52 for the second use.

(c) The adhesive 30 is then used to seal the envelope 10 with return flap face 26B adhesively secured to address panel face 12A.

(d) The recipient completes the return address at the address area 56 and places the proper postage at area 58. Alternatively, the original sender can provide the recipient's return address by computer-directed printing means at the time that the envelope blank and its enclosures are printed, die-cut and assembled. Return postage mailing indicia 58 can also be preprinted on return flap 26 by the originator.

FIG. 7 shows sealed envelope 10 ready for the second mailing by the recipient as preaddressed and postage paid by the original sender.

FIG. 8 illustrates another embodiment of the invention in which the blank 1' is laid out to provide a second tear strip 40' defined by perforation lines 42' and 46' and intermediate fold line 41'. The second tear strip 40' is removed by the second recipient to open the envelope pocket and thereby gain access to its enclosures. Assembly of this embodiment is similar to that described above, and as will be apparent to one of ordinary skill in the art, the application of adhesive to tear strips 40 and 40' is desirably accomplished simultaneously prior to folding of the blank 1'. Likewise, the perforation of the folded tear strips along lines 42, 46 and 42', 46' is preferably accomplished simultaneously by a pair of appropriately spaced perforation wheels on automated equipment.

Figure 9:
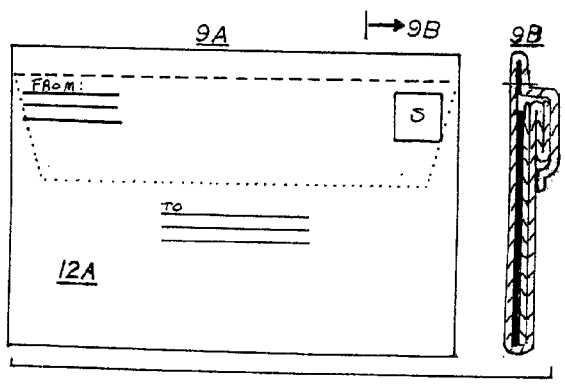
FIG. 9A is a plan view of the front of a sealed envelope according to another embodiment of the present invention ready for the first mailing.
FIG. 9B is a cross-sectional view taken along section line 9B of FIG. 9A.
Figure 10:
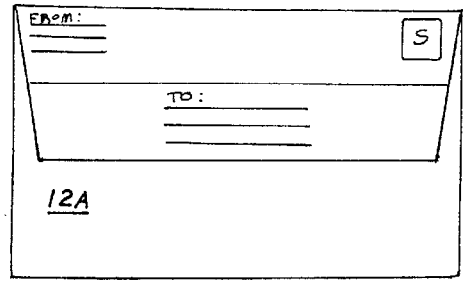
FIG. 10 is a plan view of the front of the envelope shown in FIG. 9 ready for a second mailing.

FIGS. 9 and 10 illustrate a further embodiment of the invention ready for use in the second mailing where the second sealing flap is extended to cover the original mailing address and is preprinted with the second mailing address, mailing indicia and the original recipient's return address. In this embodiment, the second flap 26 can be provided with one or more transverse folds to make it more compact and easier to withdraw from the envelope pocket. In this embodiment, as illustrated in FIGS. 9A and 9B, the envelope is ready for the first mailing and the tear strip 40 extends across the top of the sealed envelope above the fold line 28 between the rear panel 14 and the second flap 26, the flap being shown accordion folded in position during mailing. As shown in FIG. 10, when second flap 26 is extended for the second mailing and sealed in position on panel 12, it completely covers the first mailing address, and preferably is provided with the second recipient's mailing address, postage and first recipient's return address area, which can be blank or completed during the original printing.

FIGS. 11–20 illustrate further embodiments of envelopes of varying formats constructed in accordance with the invention. Additional variations will be apparent to those of ordinary skill in the art based on the descriptions provided. In each of FIGS. 11–18, the envelopes are depicted with window mailing address display areas, but it will be understood that printed addresses can be employed. The elements 12A and 14A correspond to those used above in describing FIGS. 1–7. Flap elements shown in dotted lines depict the flap positioned on the reverse side of the envelope. Dashed lines represent perforations.

Figure 11:
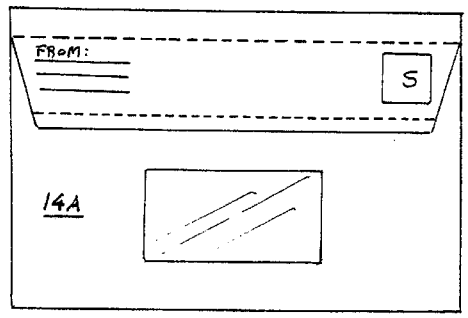
FIG. 11 is a plan view of an envelope ready for the first mailing in accordance with another embodiment of the invention.

With reference to FIG. 11, the first address display area is positioned on rear panel 14 and the first sealing flap is provided with first return mailing address and postage indicia, the first sealing flap being removable by the recipient. As illustrated, the sealing flap is provided with weakened parting line 140, i.e., perforations, parallel to the free edge of the first sealing flap. After removal of the tear strip, the first recipient removes the upper portion of the sealing flap to expose the second return address area and postage indicia printed on panel 14A.

Figure 12:
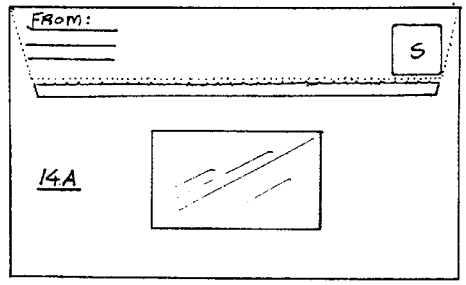
FIG. 12 is a plan view of the envelope of FIG. 11 ready for the second mailing.

Alternatively, a releasable adhesive or small adhesive spots can be employed on first sealing flap, so that the entire portion of the remaining flap can be removed following removal of the tear strip to open the envelope. FIG. 12 shows the envelope panel 14A of FIG. 11 ready for the second mailing.

Figure 13:
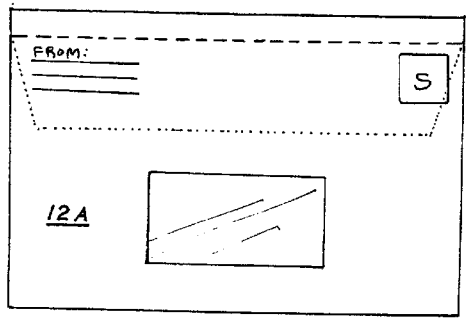
FIG. 13 is a plan view of an envelope ready for the first mailing in accordance with another embodiment of the invention.

FIG. 13 illustrates the embodiment where the front panel 12A is arranged for the first mailing and employs a window for the mailing address display.

Figure 14:
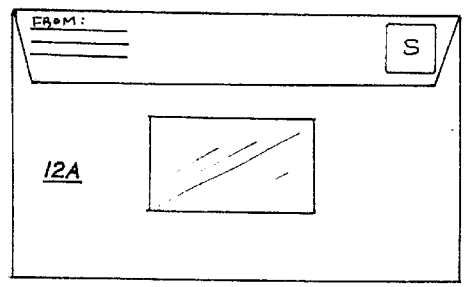
FIG. 14 is a plan view of the envelope of FIG. 13 ready for the second mailing.

FIG. 14 illustrates the reusable envelope embodiment of FIG. 13 following removal of the tear strip and placement of the second sealing flap in position on the front panel above the window. In this embodiment, the second return address and postal indicia are preprinted on the second sealing flap and cover those elements as they appeared in FIG. 13.

Figure 15:
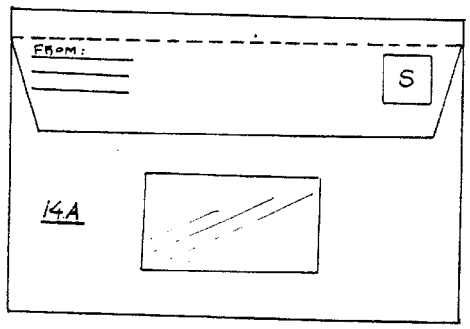
FIG. 15 is a plan view of an envelope ready for the first mailing in accordance with another embodiment of the invention.
Figure 16:
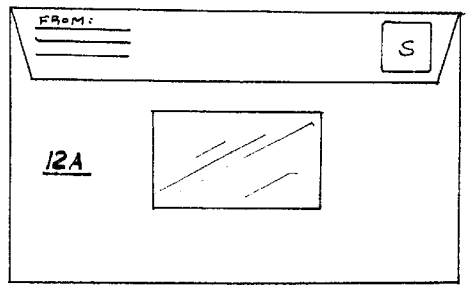
FIG. 16 is a plan view of the envelope of FIG. 15 ready for the second mailing.

The embodiment of FIG. 15 illustrates the first mailing address display area on the rear panel with the first return address and postal indicia on the first sealing flap; following removal of the tear strip and positioning of the second sealing flap with postage and return address indicia on front panel 12A, as shown in FIG. 16, the envelope is ready for its second mailing.

Figure 17:
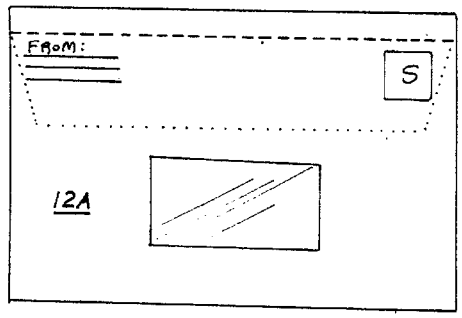
FIG. 17 is a plan view of an envelope ready for the first mailing in accordance with another embodiment of the invention.
Figure 18:
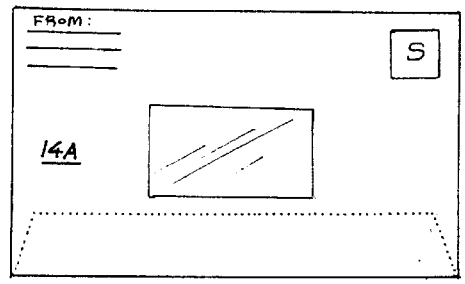
FIG. 18 is a plan view of the envelope of FIG. 17 ready for the second mailing.

FIGS. 17 and 18 illustrate a further embodiment where an envelope constructed in accordance with the invention. The envelope is preprinted with return address and postage indicia on front panel 12A as shown in FIG. 17 for the first mailing. Following removal of the tear strip, the second sealing flap (shown in dotted lines) is sealed in place for the second mailing, and as shown in FIG. 18, the rear panel is provided with a return address area and postage indicia.

Figure 19:
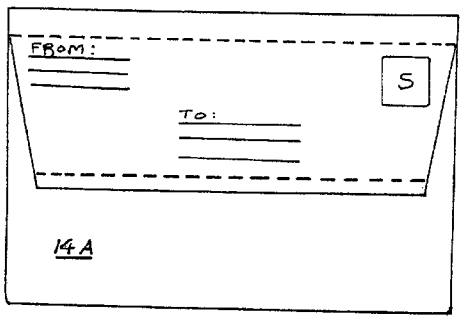
FIG. 19 is a plan view of an envelope ready for the first mailing in accordance with another embodiment of the invention.
Figure 20:
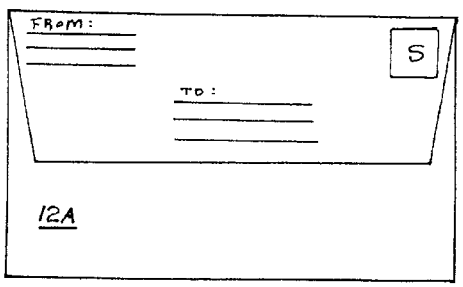
FIG. 20 is a plan view of the envelope of FIG. 19 ready for the second mailing.

In the embodiment of FIGS. 19 and 20, both the first sealing flap and second sealing flap are large enough to be provided with the respective mailing address display areas, as well as the return address and postal indicia. As illustrated in FIG. 19, the first mailing flap also includes a line of perforations to permit removal of the upper portion of the flap following separation of the tear strip from the envelope. As shown in FIG. 20, following removal of the first sealing flap, the second sealing flap is extended into position over the envelope front panel, and being preprinted with the required indicia, is ready for mailing.

Figure 21:
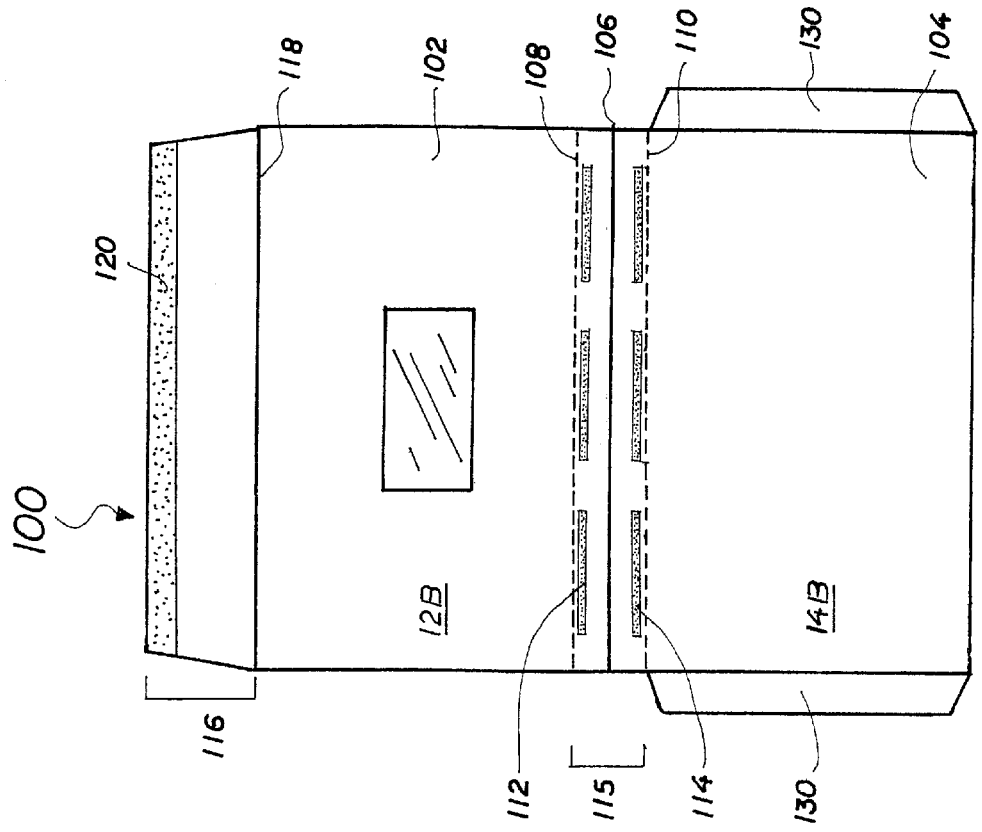
FIG. 21 is a plan view of the interior of a cut blank for an envelope in accordance with another preferred embodiment of the invention.

A second embodiment of the present invention is shown in FIGS. 21–27. In this embodiment, an envelope is constructed from a blank of 100 envelope grade material as shown in FIG. 21 and has a front panel 102 and a rear panel 104 joined to panel 102 along first fold line 106. Front panel 102 is further provided with a perforation line 108 which is positioned parallel with fold line 106 and spaced apart therefrom. Rear panel 104 is provided with a perforation line 110 which is positioned parallel to fold line 106 and spaced apart therefrom. An adhesive 112 is provided on panel 102 between fold line 106 and perforation line 108. An adhesive area 114 is provided between fold line 106 and perforation line 110 as shown in FIG. 21. The area between perforation lines 108 and 110 defines a tear strip 115. In the embodiment illustrated in FIG. 21, adhesive 112 is also applied along the interior face of either of panels 102 or 104 prior to folding along line 106. The adhesive is maintained within the bounds of transverse lines 108 and 110 which correspond to subsequently provided perforation lines as will be described in more detail below.

A conventional sealing flap 116 is joined to front panel 102 along second fold line 118. Sealing flap 116 is provided with a re-moistenable adhesive material 120 on its surface facing rear panel 104 in the folded position. The exterior of front panel 102 includes a conventional address area 124 and a stamp area 126. The blank is optionally provided with side sealing flaps 130, one face of which is provided with adhesive.

Figure 27:
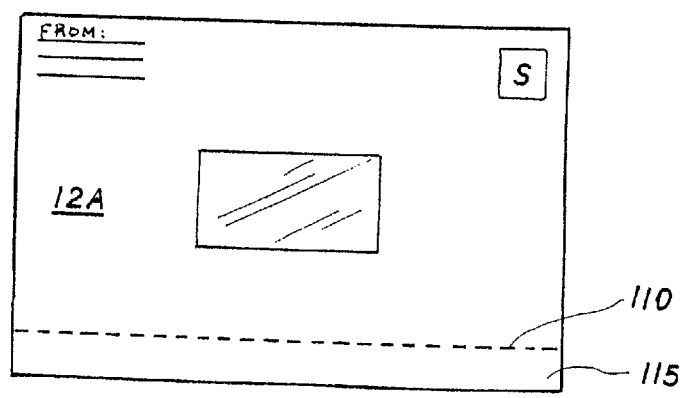
FIG. 27 is a plan view of the front of a finished envelope produced from the blank of FIG. 21.

To construct the envelope, side flaps 130 are provided with adhesive and folded inwardly; rear panel 104 is folded along first fold line 106 into superposed position on front panel 102 which also makes sealing contact with flaps 130. Sealing flap 116 is adapted for folding downwardly on rear panel 104. The adhesive areas 112 and 114 are, in a preferred embodiment, adhesively joined with liquid glue, hot melt or other form of adhesive. The application of adhesive along this narrow, lower band of the envelope serves to strengthen the tear strip 115 and to insure that the lower tear strip portion can be more easily removed along the parting line of perforations. The completed envelope 100 is shown in FIG. 27 and is similar in appearance to that shown ready for mailing in FIG. 2G. To open envelope 100 the tear strip 115 is torn along perforation lines 108 and 110.

In the production of direct mail articles in accordance with the invention, side flaps 130 can be eliminated and the opposing side edges of panels 102, 104 can be joined by adhesive in order to simplify production.

Figure 22:
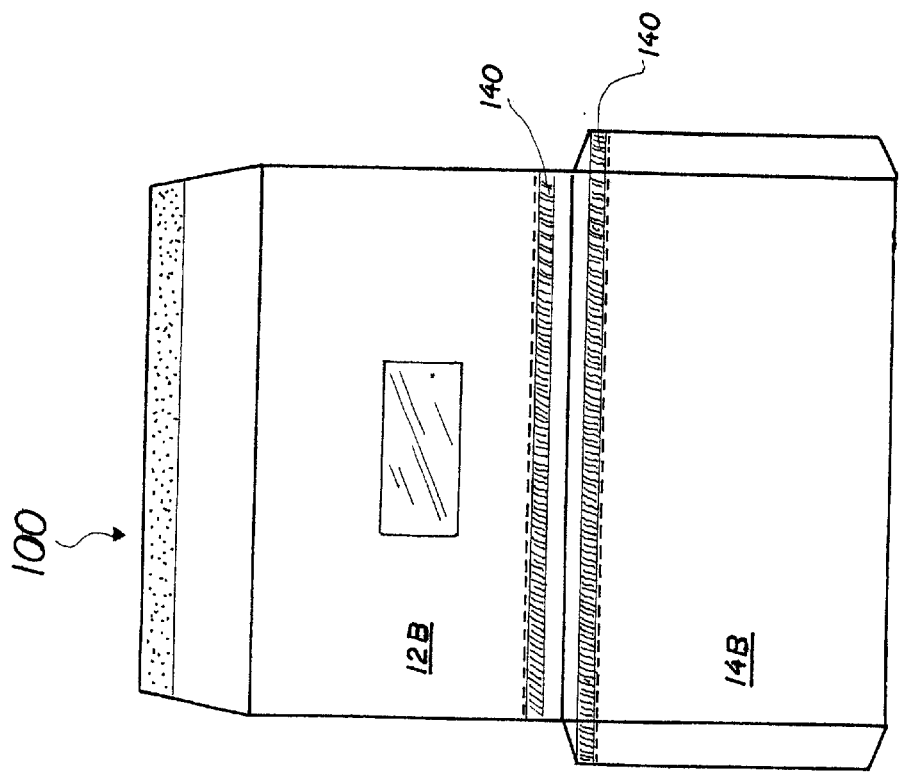
FIG. 22 is a plan view of the interior of a cut blank in accordance with another embodiment of the invention.
Figure 26:
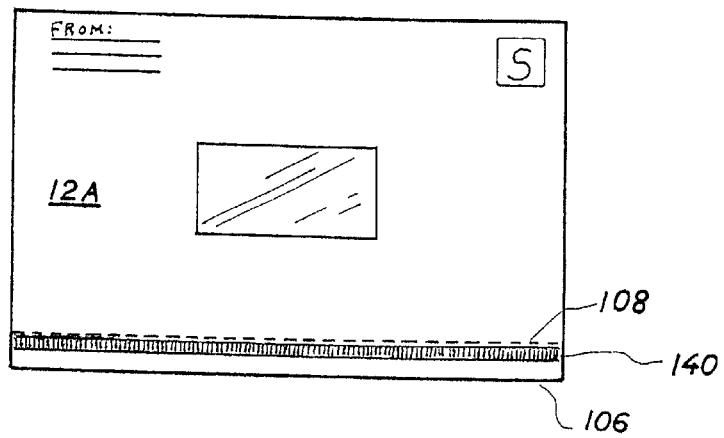
FIG. 26 is a plan view of the front of a finished envelope produced from the blank of FIG. 22.

In an alternative preferred embodiment illustrated in FIGS. 22 and 26, a series of paper crimps are incorporated mechanically into the tear strip after folding along line 106. As used herein, the term "crimping" or "crimps" means an indentation or partial peroration applied to mate or temporarily join a pair of paper panels. The crimping is accomplished by a crimping wheel or similar device. The crimping is positioned adjacent to, or along the same transverse line as the perforations. The formation of the crimps resists a laterally applied force. As will be understood by one of ordinary skill in the art, a s plurality of spaced crimps will prevent the enclosures placed or formed in the envelope on one side of this transverse crimp line from moving into the adjacent tear strip portion of the envelope. With reference to FIG. 22, it will also be understood that the crimp areas 140 are indicated in the extended blank for purposes of illustration only, since the crimps can only be completed after the paper has been folded into superimposed position. Thus, the crimping is completed after adhesive is optionally applied in the area defining the tear strip 115 and the flap is folded to bond the sides together and the superposed sides are pressed between the opposing faces of the crimping apparatus.

In the production of the envelopes shown in FIGS. 21–27, it is also preferable to form the perforations after the envelope front and rear panels are glued and folded in superimposed position so that the perforations are aligned to thereby insure an even and clean tear line.

Figure 25:
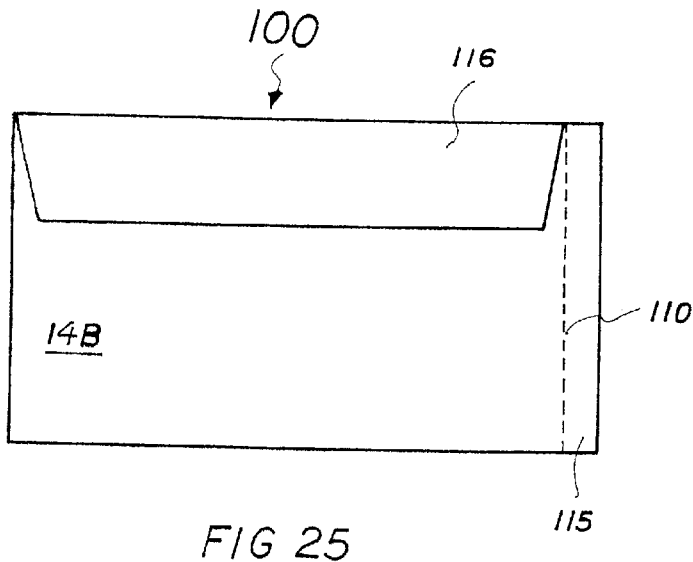
FIG. 25 is a plan view of the rear of a finished envelope produced from the blank of FIGS. 23 and 24.

A further embodiment is illustrated in FIGS. 23–25 where the easy-open tear strip is positioned along one side of the envelope. With reference to FIG. 23, the rear panel is provided with tear strip defined by parting lines 108 and 110 positioned between a lateral edge and side sealing flap 130, the tear strip being bisected by fold line 106 into sections 132 and 134. As shown in the embodiment of FIG. 23, a plurality of adhesive areas 121 are provided on the interior surface of tear strip 115 to join sections 132 and 134 after folding along line 106. With reference to FIG. 24, the exterior of the blank 101 shows adhesive 120 applied to the edges of side sealing flaps 130, and the front of the envelope provided with the conventional mailing indicia. It is to be noted from FIGS. 23 and 24 that the tear strip 115 extends laterally from the edge of the front and rear envelope panels, and as best shown in FIG. 25, from the body of the completed envelope, including the folded top sealing flap 116.

The manufacture of this embodiment is similar to those described previously, with the exception that the side sealing flap 130 adjacent tear strip is folded into position at the same time sealing flap sections are folded along line 106 to bond the interior faces together to form the reinforced tear strip 115. The front panel 102 is then folded down to contact the adhesive areas 120 on folded side sealing flaps 130 to form the envelope pocket. The envelope is then passed through perforations, means to form perforation lines 108, 110.

As noted in the embodiment described above, the adhesive areas 121, even though applied in a non-continuous manner, comprise a barrier to the undesired movement of the envelope enclosure(s) into the region of the tear strips.

In a further preferred embodiment of this aspect of the invention (not illustrated) the tear strip is provided with a row crimps immediately adjacent perforation lines 108, 110. In this embodiment, the line of crimps define a barrier to the movement of the enclosures in the envelope into the tear strip area defined by the perforations, thereby precluding any damage to the enclosures when the tear strip is removed by the recipient, and the adhesive areas 112 and 114 can be optionally eliminated. Thus, it would be understood by those familiar with the art, the crimps can be incorporated and made coincident with the perforation line. Although optional, it is also desirable in this embodiment to include reinforcing adhesive, e.g., hot melt adhesive, along the interior surfaces to bond the opposing sides of the tear strip to add additional strength and thereby facilitate its clean removal.

While the fundamental novel features of the invention have been shown and described, it should be understood that various substitutions, modifications and variations may be made by those skilled in the art, without departing from the spirit or scope of the invention. Accordingly, all such modifications or variations are included in the scope of the invention as defined by the claims that follow.

I claim:

1. A reusable window envelope comprising:

a front panel and a rear panel joined along a first transverse fold line and along their lateral edges to form an envelope pocket having an open top;

the front panel having a window address display area for use in a first and second mailing;

the front panel being printed to define a first use postage area and return address area adjacent its top edge and a second use postage area and return address area adjacent the transverse fold line, the first use and second use postage areas being positioned diagonally from each other;

a first extended sealing flap joined to the top edge of the front panel along a first weakened tear line running parallel to the top edge of the front panel and the flap having a first adhesive area proximate its free end for sealing the envelope for a first mailing;

the first extended sealing flap having a second weakened tear line parallel to the first tear line and spaced apart therefrom, the area between the first and second tear lines definig a tear strip;

the first extended sealing flap further having a flap fold line midway between the first and second tear lines, the sealing flap being folded in superposed position to align the tear lines and position the first adhesive area on the envelope rear panel;

a second sealing flap joined along a second fold line to the top edge of the rear panel and folded in a first position against the rear panel and covered by the first sealing flap during the first mailing;

the second sealing flap having sealing means proximate its free end for sealing the envelope when the second sealing flap is folded over and onto the front panel in a second position for a second mailing following removal of the tear strip, whereby said second sealing flap substantially covers said first use postage and return address areas.

2. The envelope of claim 1 where the first tear line defines the top edge of the front panel.

3. The envelope of claim 1 where the interior surfaces comprising the tear strip are adhesively bonded together.

4. The reusable window envelope of claim 3 where the adhesive is not continuous.

5. The envelope of claim 1 where the weakened tear lines are formed by perforations.

6. The envelope of claim 5 where the perforations are slit perforations.

7. The envelope of claim 1 where the first and second lines of perforation are formed simultaneously after folding the extended flap along the flap fold line.

8. The envelope of claim 1 which further comprises side sealing flaps for joining the lateral edges of the front and rear panels.

9. The envelope of claim 1 where the adhesive area of the first sealing flap is bounded by a lateral weakened parting line extending across the flap parallel to the free edge of the flap, whereby after the tear strip is removed from the envelope, the remaining portion of the first sealing flap adjacent the adhesive area can be removed by separation along the weakened parting line.

10. The reusable window envelope of claim 1 where the second sealing flap is folded inside the envelope pocket in the first position.

11. The reusable window envelope of claim 1 where the first sealing flap adhesive area contains a releasable adhesive.

* * * * *